US008819463B2

(12) United States Patent
Burchard et al.

(10) Patent No.: US 8,819,463 B2
(45) Date of Patent: Aug. 26, 2014

(54) ELECTRONIC DEVICE, A METHOD OF CONTROLLING AN ELECTRONIC DEVICE, AND SYSTEM ON-CHIP

(75) Inventors: Artur Tadeusz Burchard, Eindhoven (NL); Herman Hartmann, Veldhoven (NL)

(73) Assignee: NXP B.V., Eindhoven (NL)

( * ) Notice: Subject to any disclaimer, the term of this patent is extended or adjusted under 35 U.S.C. 154(b) by 206 days.

(21) Appl. No.: 13/001,405

(22) PCT Filed: Jun. 23, 2009

(86) PCT No.: PCT/IB2009/052690
§ 371 (c)(1),
(2), (4) Date: Dec. 23, 2010

(87) PCT Pub. No.: WO2009/156946
PCT Pub. Date: Dec. 30, 2009

(65) Prior Publication Data
US 2011/0113274 A1    May 12, 2011

(30) Foreign Application Priority Data

Jun. 25, 2008  (EP) ..................................... 08158923
Jun. 23, 2009  (WO) .................. PCT/IB2009/052690

(51) Int. Cl.
*G06F 1/32*    (2006.01)
(52) U.S. Cl.
CPC ........... *G06F 1/3203* (2013.01); *Y02B 60/1217* (2013.01)
USPC ........................................................ 713/322
(58) Field of Classification Search
USPC ........................................................ 713/322
See application file for complete search history.

(56) References Cited

U.S. PATENT DOCUMENTS

| 6,845,456 | B1 | 1/2005 | Menezes et al. |
| 7,272,517 | B1* | 9/2007 | Brey et al. ........................ 702/60 |
| 8,037,480 | B1* | 10/2011 | Clark et al. .................... 719/318 |
| 2003/0079151 | A1* | 4/2003 | Bohrer et al. ................. 713/320 |

(Continued)

FOREIGN PATENT DOCUMENTS

| WO | 2006/056824 A2 | 6/2006 |
| WO | 2007/148159 A1 | 12/2007 |
| WO | 2009/156948 A2 | 12/2009 |

OTHER PUBLICATIONS

Friedrich-Alexander Universitat, "Bibliography on Power Management", Dept. of Computer Science, retreived on Dec. 22, 2010 from Internet at http://www4.infolink.uni-erlangen.de/Research/PowerManagement/Bibliography.

(Continued)

*Primary Examiner* — Nimesh G Patel

(57) ABSTRACT

An electronic device is provided, which comprises at least one processing unit (CPU) for processing at least one application, an operating system (OS) for controlling the at least one application performed by the at least one processing unit (CPU), at least one workload build-up detector (WBD) for detecting a build-up of the workload of the at least one processing unit (CPU), at least one workload decrease detector (WDD) for detecting a decrease of the workload of the at least one processing unit (CPU), and at least one power management unit (SPM) for controlling an operating frequency and/or an operating voltage of the at least one processing unit in dependence on the detected workload build-up or the detected workload decrease.

14 Claims, 2 Drawing Sheets

(56) References Cited

U.S. PATENT DOCUMENTS

| | | |
|---|---|---|
| 2006/0047987 A1 | 3/2006 | Prabhakaran et al. |
| 2007/0006007 A1* | 1/2007 | Woodbridge et al. ......... 713/322 |
| 2007/0061021 A1* | 3/2007 | Cohen et al. ................... 700/30 |
| 2007/0239398 A1* | 10/2007 | Song et al. .................... 702/186 |
| 2008/0098254 A1* | 4/2008 | Altevogt et al. .............. 713/600 |
| 2009/0144572 A1* | 6/2009 | Rozen et al. ................. 713/322 |
| 2009/0167770 A1* | 7/2009 | Navale et al. ................. 345/501 |
| 2009/0210740 A1* | 8/2009 | Huang et al. .................. 713/502 |
| 2011/0099404 A1 | 4/2011 | Hartmann et al. |

OTHER PUBLICATIONS

International Search Report for Int'l Patent Application No. PCT/IB2009/052690 (Oct. 6, 2009).

* cited by examiner

ELECTRONIC DEVICE, A METHOD OF CONTROLLING AN ELECTRONIC DEVICE, AND SYSTEM ON-CHIP

FIELD OF THE INVENTION

The present invention relates to an electronic device, to a method of controlling an electronic device, and a system on-chip.

BACKGROUND OF THE INVENTION

In modern mobile or portable devices power management has become a major issue as typically the energy sources of the mobile or portable devices have a limited capacity while the functionality of modern mobile and portable devices have increased significantly. One aspect of power management is the so-called dynamic power management DPM. By means of a dynamic power management DPM an efficient power management over a variability of applications can be provided (also less heat which means improved thermal properties and related benefits: fan-less). Through the dynamic power management the power delivered to an electronic device or an integrated circuit can be adapted to the actual workload of an application, which may vary greatly. A specific application which is executed on a hardware unit requires a certain level of workload for a certain period of time. The workload can be measured as a ratio of the execution time and the total time available to the hardware unit. The workload can also be measured as a ratio of the number of clock cycles used for the execution of the application and the total number of available clock cycles for a period. By means of a frequency and/or voltage scaling the power consumption of a hardware unit is controlled.

One feature of a good power management should be that any real-time applications is not be effected by the power management. The power management should not be affected in sense of missing any of its deadlines; in general the execution of real-time application can be affected as long as all deadlines are met. In particular, power manager by changing frequency always changes timing of a real-time application affecting it somehow. In particular an end of execution of each task comes closer to its deadline, but should not miss it. The power management can for example be performed by changing the frequency and the voltage of parts of the electronic device or the integrated circuit.

Typical applications which are performed on the electronic device may include best-effort tasks or real-time tasks. A best-effort task relates to a task that is not constrained to a deadline but is executed as fast as possible. Best-effort task may include internet browsing, file browsing, and file manipulation (copying, moving etc.) as well as office applications. For portable systems best-effort task may include picture taking and picture browsing.

A real-time task relates to a task that has deadlines, i.e. it has to be executed before a certain deadline. Here is not important whether the task is executed fast or slow as long as the deadline is met. Examples for such task may include video and audio playback.

Typically, the power management for best-effort task is to control the frequency of related hardware units like a central processing unit CPU, wherein the frequency is controlled to a maximum and kept as this level until the task has been finished.

FIG. 1 shows a representation of a workload scheme for an electronic device according to the prior art. In particular start-ups and shut-downs of several applications are depicted. The graph A relates to the start-up of a task manager, the graph B relates to a start-up of FireFox, the graph C relates to a shut-down of FireFox. The graph D relates to a start-up of LotusNotes and the graph E relates to a shut-down of Lotus-Notes. Accordingly, best-effort task require processing power at start-up as well as during the shut-down.

FIG. 2 shows a graph of the workload shapes of real-time applications at start-up. The graph F shows the start-up of the Windows Media Player and the graph G shows the start-up of the Windows Media Player for video playback.

The vertical scale of FIG. 1 corresponds to the workload of a processing unit like a CPU in percentages from 0-100%. The horizontal scale is in seconds. The distance between two vertical lines may correspond to 6 seconds. Approximately one peek time length is between 3 and 6 seconds. However it should be noted that the frequency and voltage changes are in the range of milliseconds.

Accordingly, the electronic devices according to the prior art are not power efficient with respect to best-effort tasks, as the frequency is kept at its maximum value for the whole start-up or shut-down procedure.

SUMMARY OF THE INVENTION

It is therefore an object of the invention to provide an electronic device with improved power efficiency in particular with respect to execution of best-effort tasks or start-up of real-time task.

This object is solved by an electronic device according to claim 1 and a method for controlling an electronic device according to claim 4, and a system on-chip according to claim 5.

Therefore, an electronic device is provided, which comprises at least one processing unit for processing at least one application, an operating system for controlling the at least one application performed by the at least one processing unit, at least one workload build-up detector for detecting a build-up of the workload of the at least one processing unit, at least one workload decrease detector for detecting a decrease of the workload of the at least one processing unit, and at least one power management unit for controlling an operating frequency and/or an operating voltage of the at least one processing unit in dependence on the detected workload build-up or the detected workload decrease.

According to an aspect of the invention the power management unit is adapted to increase the operating frequency and/or the operating voltage if a workload build-up has been detected and wherein the power management unit is adapted to decrease the operating frequency and/or the operating voltage if a workload decrease is detected.

According to still a further aspect of the invention the at least one application performed by the at least one processing unit includes best-effort tasks. The workload build-up detector and the workload decrease detector are adapted to detect the workload build-up and the workload decrease of the best-effort task.

The invention also relates to a method for controlling an electronic device having at least one processing unit for processing at least one application. The at least one application performed by the at least one processing unit is controlled, A build-up of the workload of the at least one processing unit is detected, A decrease of the workload of the at least one processing unit is detected. An operating frequency and/or an operating voltage of the at least one processing unit is controlled in dependence on the detected workload build-up or the detected workload decrease.

The invention also relates to a system on chip which comprises at least one processing unit for processing at least one application, an operating system for controlling the at least one application performed by the at least one processing unit, at least one workload build-up detector for detecting a build-up of the workload of the at least one processing unit, at least one workload decrease detector for detecting a decrease of the workload of the at least one processing unit, and at least one power management unit for controlling an operating frequency and/or an operating voltage of the at least one processing unit in dependence on the detected workload build-up or the detected workload decrease.

The invention relates to the idea that for example during a start-up of an application the workload has specific (reoccurring) shape as it gradually builds up and optionally after a period of maximum workload, the workload decreases gradually. From FIG. 1 it can be seen that the applications often have at start-up a similar shape. Accordingly, the workload is gradually increased and gradually decreases when the application is loaded. However, it should be noted when after start-up immediately a certain task is to be performed, the shape of the workload will be different and may correspond more to the workload shape G according to FIG. 2.

Furthermore, the invention relates to the recognition that according to the prior art during a start-up, the CPU is clocked at its maximum operating frequency during the entire start-up period such that a number of cycles will be unused. These unused clock cycles may be called slack. It should be noted that there is a direct relationship between the presence of slack and the energy efficiency of the system. If slack is present in the electronic device, this is an indication that the frequency and/or the voltage can be reduced in order to improve the power efficiency.

The invention furthermore is related to the recognition that best-effort task have a specific workload shape with respect to time. Typically the best-effort (recurring) task does not cause 100% workload immediately but instead the workload is increased gradually and decreases gradually. Accordingly, for the power efficient execution of recurring best-effort task the frequency and/or the operating voltage can be gradually increased from minimum values followed by an optional period of maximum performance which is again followed by a gradual decrease of the frequency and voltage.

Further aspects of the invention are defined in the dependent claims.

BRIEF DESCRIPTION OF THE DRAWINGS

Embodiments and advantages of the invention will now be described in more detail with reference to the Figures.

DETAILED DESCRIPTION OF EMBODIMENTS

According to some embodiments of the invention the power management of a mobile electronic device is controlled by means of a dynamic power management DPM, wherein a dynamic voltage and frequency scaling DVFS is performed.

Figure 1:
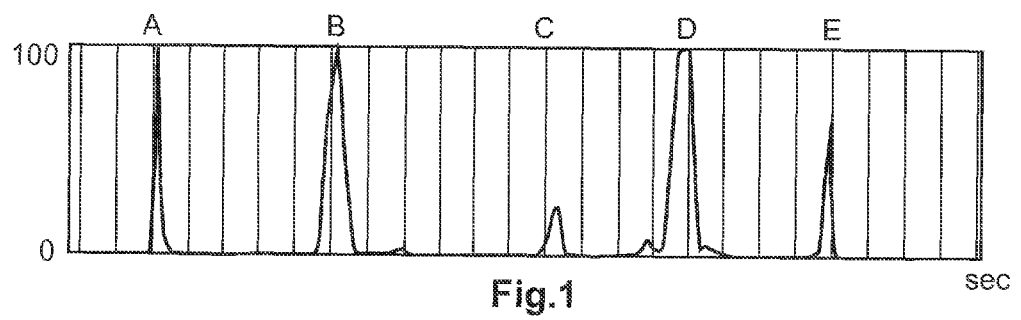
FIG. 1 shows a basic presentation of a workload shape of best-effort task according to the prior art.
Figure 2:
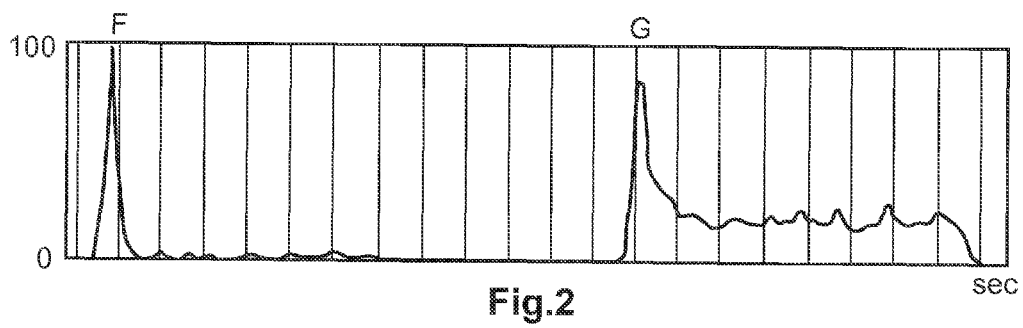
FIG. 2 shows a graph of a workload shape of real-time task.
Figure 3:
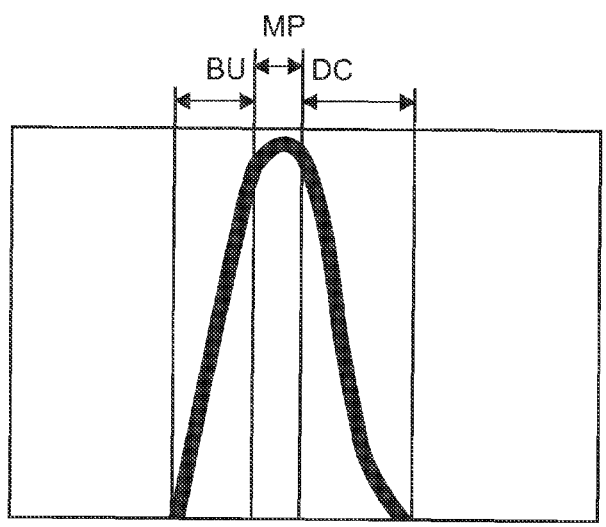
FIG. 3 shows a graph of a workload shape during start-up.

FIG. 3 shows a graph depicting a workload shape of an application during start-up. The workload can be measured as a ratio of the execution time and the total time available to the hardware unit. The workload can also be measured as a ratio of the number of clock cycles used for the execution of the application and the total number of available clock cycles for a period. As seen in FIG. 3, the workload (at the start-up of an application) can be divided into three parts, namely build-up part BU, the maximum performance part MP and the decreased part DC. The shape of the workload is caused by an initial loading of a program code into a main memory. Typically the program code is stored in a background memory for example when the processor is in an idle state. Thereafter, a gradual increase of the execution of parts of the application or of parts of the functionality takes place for example as more and more of the functionality is loaded into the main memory and the processor is executing some part of the functionality. Thereafter, the workload can reach a maximum, i.e. the maximum performance. Then, less and less of the program code needs to be loaded such that the workload is decreased to zero. For example, a build up of the workload may require 1.5 seconds, the maximum performance requires 0.5 seconds and the decrease requires approximately 3 seconds.

According to the invention, the frequency and/or the voltage of an electronic device or an integrated circuit is controlled such that the operating frequency is changed by increasing or decreasing the frequency during the workload build-up and the workload decrease. This is advantageous, as the slack of a processing unit is reduced such that a processing unit can be operated at an optimal dynamically adapted frequency and voltage during whole execution of a best-effort task (like start-up).

In order to implement dynamic power management in particular for (recurring) best-effort tasks a start-up detection can be performed. Here, the start-up of an application should be detected. This can for example be performed by a notification from the operating system or by monitoring the workload of a processing unit to detect a sudden increase in workload. Furthermore, the slope of the performance build-up of the processing unit should be controllable to match the build-up of the workload of the application. The increasing number of clock cycles per unit of time and thus also increasing dissipated power of the processing unit is matched to the increasing application demand. Hence, the electronic device must be able to control the processing capability of a processing unit to be able to follow a gradually increasing workload of a start up of an application. The control of the workload may for example be performed by means of a dynamic control of the frequency. The operating frequency can for example be gradually increased to match the increasing workload. If a voltage control is implemented which matches the operating frequency any processing units will operate at an optimal power.

The electronic device or the system should be able to control or set the maximum performance of the processing unit until a workload decreases. However, it should be noted that the maximum performance period does not exist for all applications during start-up.

Furthermore, this electronic device must be able to detect a decrease of the workload. The decrease of the workload can for example be detected by monitoring the workload. Furthermore, the slope of the decrease of the workload or the performance and power of hardware should be controllable in order to be able to comply with the slope of decreasing workload of an application. This can again be performed by means of a dynamic control of the frequency such that the frequency is gradually decreased to match the enquired workload, i.e. the processing unit will operate at an optimal power.

Alternately, if the applications which are executed on the processing unit are known and are fixed, a static power management may be applied. Accordingly, the build-up period, the maximum performance period and the decreased period are known beforehand and can therefore be applied to implement a power management by controlling the frequency and/or the voltage. However, it should be noted, that a characterization of these applications must be performed before the application is run on the electronic device and the characteristics thereof must be stored in the electronic device. Alternatively, the characterization can be performed during the first/initial run, such that for all the following start-ups the known and stored characteristic can be used to efficiently manage performance/workload/energy/slopes.

Figure 4:
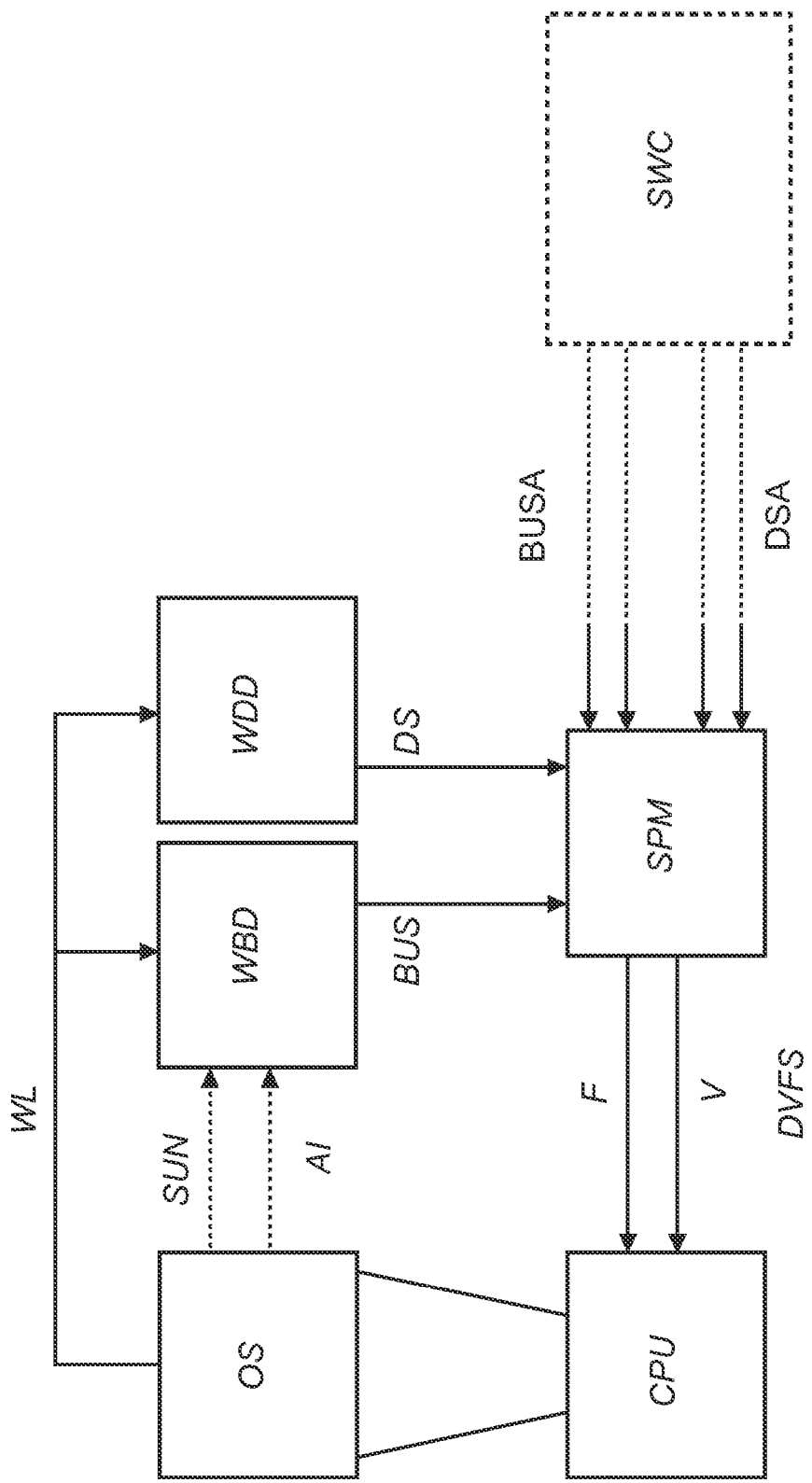
FIG. 4 shows a block diagram of an electronic device according to a first embodiment.

FIG. 4 shows a block diagram of an electronic device according to the first embodiment. The electronic device comprises a processing unit CPU, an operating system OS, a workload build-up detector WBD, a workload decrease detector WDD, a power managing unit SPM. The operating system OS can run on the processing unit CPU which may be implemented as a central processing unit CPU. The operating system OS may initiate the start-up notification SUN of the workload. The operating system OS may further send the start-up notification SUN to the workload build-up detector WBD. In addition or alternatively the workload build-up detector WBD may monitor the workload WL of the processing unit CPU and may thereby detect a build-up face of the workload.

The workload WL may be measured by the operating system or alternatively by a hardware performance counter.

When the workload build-up detector WBD has detected a build-up of the workload WL it will send build-up start BUS notification to the power management unit SPM, which may then apply a control of the frequency and the voltage of the processing unit. According to the invention, when an increase in workload is detected, the operating frequency of the processing unit is increased. The increase of the frequency will be related to the resolution (how much is certain value of frequency is applied) and to a step size (how long is certain value of frequency is applied), which (step size and resolution) can be programmed to the SPM The resolution and the step will together determine the angle of the increase of the workload. The workload decrease detector WDD detects a decrease in the workload. When the workload decrease detector WDD has detected that the workload is starting to decrease it will send a decrease start DS notification to the power management unit SPM such that it can control the frequency by decreasing the frequency accordingly. The decrease is again specified by the resolution and the step, such that the angle of the performance decrease matching the workload decrease is determent by the resolution and the step.

It should be noted that the power management unit SPM is adapted to control the operating voltage settings of the processing unit such that the frequency requirements are met.

According to an alternative embodiment, the applications which are to run on the electronic device can be characterized by a start-up workload characterization unit SWC. This is preferably performed offline, but can also be done on-line during the very first/initial run/start-pu of the application. The characteristics of a workload can be described by an angle of the slope of the build-up BUSA, namely by the step size and the resolution and by the angle of the slope of decrease of the workload DSA which may also be expressed by another step size and another resolution. These characteristics can be stored for example in the power management unit SPM (or elsewhere) and can be used when the corresponding application is run on the processing unit. It should be noted that controlling the frequency changes of the operating frequency of the processing unit to match a specific slope of a workload can be achieved in a number of ways. It should be noted that a full continuum of the workload slope is typically not possible as the electronic device and the operating frequency has a certain resolution and a certain set of values. However, a linear slope is possible if a specific frequency value is applied for a specific time period. By programming the resolution and the step a greater variety of angles of the workload slope can be implemented, through approximations.

By the means of the above described principles of the invention the slack of a processing unit running at its optimum dynamically controlled frequency and voltage during start-up of an application is reduced what reduces the power consumption. Due to the reduced power consumption less heat is generated and a fan-less and therefore more silent device can be achieved (also, even primarily, longer battery life can be achieved).

The above described principals of the invention may be applied for example in a system on chip with a programmable processing unit like a CPU. Such system on chips may be used in portable or mobile devices like MP3 players, mobile phones or multimedia assistants.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. In the device claim enumerating several means, several of these means can be embodied by one and the same item of hardware. The mere fact that certain measures are recited in mutually different dependent claims does not indicate that a combination of these measures cannot be used to advantage.

Furthermore, any reference signs in the claims shall not be constrained as limiting the scope of the claims.

The invention claimed is:
1. Electronic device, comprising:
at least one processing circuit configured and arranged to process at least one application,
an operating system configured and arranged to control the at least one application performed by the at least one processing circuit,
at least one workload build-up detector configured and arranged to detect a build-up of the workload of the at least one processing circuit due to the at least one application,
at least one power management unit configured and arranged to control an operating frequency and an operating voltage of the at least one processing circuit in dependence on the detected workload build-up due to the at least one application, and
wherein the power management unit is configured and arranged to increase the operating frequency and the operating voltage when a workload build-up has been detected, wherein the operating frequency is arranged to be increased at a rate that matches a rate of the build-up of the workload due to the at least one application, wherein the rate of the build-up of the workload due to the at least one application is determined during an initial or first run of the at least one application and the determined rate of the build-up is used during subsequent start-ups of the at least one application for the purpose of increasing the operating frequency and the operating voltage when the workload build-up is detected.

2. Electronic device according to claim 1, further comprising
at least one workload decrease detector configured and arranged to detect a decrease of the workload of the at least one processing circuit, and
wherein the power management unit is configured and arranged to decrease the operating frequency and the operating voltage when a workload decrease is detected by controlling a slope of the decrease of a performance of the at least one processing circuit.

3. Electronic device according to claim 2, wherein the at least one application performed by the at least one processing circuit includes best-effort tasks, and wherein the workload build-up detector and the workload decrease detector are configured and arranged to detect the workload build-up and the workload decrease of the best-effort task.

4. The electronic device of claim 2, wherein the power management unit is configured and arranged to decrease the operating frequency and the operating voltage when a workload decrease is detected by dynamically controlling a slope of the decrease of a performance of the at least one processing circuit to linearly match a slope of the workload decrease.

5. Electronic device according to claim 1, wherein the power management unit is configured and arranged to store a characteristic angle of the slope of the workload build-up of an application which is to run on the electronic device, and the power management unit is configured and arranged to use the characteristic angle for controlling frequency changes of the operating frequency of the at least one processing circuit to match a specific slope of a workload of the application.

6. Electronic device according to claim 5, further comprising a start-up workload characterization unit configured and arranged to characterize the characteristic angle of the slope of the workload build-up of the application which is to run on the electronic device.

7. Electronic device according to claim 1, configured and arranged to detect start-up of a best-effort task by a notification from the operating system.

8. The electronic device of claim 1, wherein the at least one workload build-up detector is configured and arranged to
detect the build-up of the workload by detecting an increase in loading and execution of program code for the application loaded into main memory accessed by the at least one processing circuit, and
detect a decrease in the workload of the at least one processing circuit in response to all of the program of the application being loaded into the main memory.

9. The electronic device of claim 1, wherein the power management unit is configured and arranged to increase the operating frequency and the operating voltage by dynamically increasing the operating frequency and the operating voltage to linearly match the slope of the performance build-up.

10. Method for controlling an electronic device having at least one processing circuit for processing at least one application, comprising the steps of:
controlling the at least one application performed by the at least one processing circuit,
detecting a build-up of workload of the at least one processing circuit due to the at least one application,
detecting a decrease of the workload of the at least one processing circuit, and
controlling an operating frequency and an operating voltage of the at least one processing circuit in dependence on one of the detected workload build-up and the detected workload decrease due to the at least one application,
increasing the operating frequency and the operating voltage if a workload build-up has been detected, wherein the operating frequency is arranged to be decreased at a rate that matches a rate of the workload decrease due to the at least one application, wherein the rate of the workload decrease due to the at least one application is determined during an initial or first run of the at least one application and the determined rate of the build-up is used during subsequent start-ups of the at least one application for the purpose of decreasing the operating frequency and the operating voltage when the workload build-up is detected.

11. Method for controlling an electronic device as in claim 10, further comprising:
detecting a decrease of the workload of the at least one processing circuit,
decreasing the operating frequency and the operating voltage if a workload decrease is detected by controlling a slope of the decrease of a performance of the at least one processing circuit.

12. The method of claim 10, wherein
detecting the build-up of the workload includes detecting an increase in loading and execution of program code for the application loaded into main memory accessed by the at least one processing circuit, and
detecting the decrease of the workload includes detecting the decrease in response to all of the program of the application being loaded into the main memory.

13. The method of claim 10,
further including controlling the operating frequency and the operating voltage of the at least one processing circuit in response to the detected workload decrease by controlling the slope of a performance decrease of the at least one processing circuit to linearly match the detected decrease, and
wherein controlling the slope of the performance build-up of the at least one processing circuit to match the build-up of the workload includes controlling the slope of the performance build-up of the at least one processing circuit to linearly match the slope of the build-up of the workload.

14. System on chip, comprising:
at least one processing circuit configured and arranged to process at least one application,
an operating system configured and arranged to control the at least one application performed by the at least one processing circuit,
at least one workload build-up detector configured and arranged to detect a build-up of the workload of the at least one processing circuit due to the at least one application,
at least one power management unit configured and arranged to control an operating frequency and an operating voltage of the at least one processing circuit in dependence on the detected workload build-up due to the at least one application, and
wherein the power management unit is configured and arranged to increase the operating frequency and the operating voltage when a workload build-up has been detected, wherein the operating frequency is arranged to be increased at a rate that matches a rate of the build-up of the workload due to the at least one application, wherein the rate of the build-up of the workload due to the at least one application is determined during an initial or first run of the at least one application and the determined rate of the build-up is used during subsequent start-ups of the at least one application for the purpose of increasing the operating frequency and the operating voltage when the workload build-up is detected.

* * * * *